(12) United States Patent
Brezina et al.

(10) Patent No.: US 6,634,802 B2
(45) Date of Patent: Oct. 21, 2003

(54) OPTICAL-ELECTRONIC ARRAY MODULE AND METHOD THEREFORE

(75) Inventors: Johnny Roy Brezina, Austin, TX (US); Brian Michael Kerrigan, Austin, TX (US); Gerald Daniel Malagrino, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 09/925,593

(22) Filed: Aug. 9, 2001

(65) Prior Publication Data

US 2003/0031427 A1 Feb. 13, 2003

(51) Int. Cl.7 .................................................. G02B 6/36
(52) U.S. Cl. ............................. 385/88; 385/89; 385/92
(58) Field of Search ............................. 385/88, 89, 90, 385/91, 92

(56) References Cited

U.S. PATENT DOCUMENTS

| | | | |
|---|---|---|---|
| 5,241,614 A | 8/1993 | Ecker et al. | 385/94 |
| 5,333,225 A | 7/1994 | Jacobowitz et al. | 385/93 |
| 5,337,398 A | 8/1994 | Benzoni et al. | 385/90 |
| 5,909,523 A | 6/1999 | Sakaino et al. | 385/49 |
| 5,909,524 A | 6/1999 | Tabuchi | 385/49 |
| 5,913,002 A | 6/1999 | Jiang | 385/88 |
| 6,027,254 A | 2/2000 | Yamada et al. | 385/88 |
| 6,151,173 A | 11/2000 | Massit et al. | 359/811 |
| 6,151,430 A | 11/2000 | Traver, Jr. et al. | 385/14 |
| 6,164,836 A | 12/2000 | Yamada et al. | 385/88 |
| 6,497,518 B1 * | 12/2002 | Deane | 385/92 |

* cited by examiner

*Primary Examiner*—Michael C. Zarroli
(74) *Attorney, Agent, or Firm*—Anthony V. S. England; Mark E. McBurney

(57) ABSTRACT

In one aspect of the invention, an assembly includes an optical-electronic die having electrically conductive pads and a submount with first and second opposing sides and a third side essentially perpendicular to the first submount side. The first and third submount sides have an adjoining edge, with electrically conductive pads on the first submount side bonded to the die pads, second electrically conductive pads on the third side of the submount, and electrically conductive traces interconnecting the first and second submount pads. The conductive traces are formed on the first and third sides and adjoining edge of the submount by a process that uses a shadow mask.

21 Claims, 7 Drawing Sheets

OPTICAL-ELECTRONIC ARRAY MODULE AND METHOD THEREFORE

BACKGROUND

1. Field of the Invention

This invention relates to an optical-electronic array module for connecting to a fiber optic cable and to electronic devices on an electronic circuit board, and more particularly to an arrangement of the module that facilitates assembly of the module and alignment and connection of the module to the fiber optic cable electronic circuit board.

2. Related Art

Optical-electronic transmitters and receivers on an optical-electronics module are conventionally coupled to optical signals via a fiber-optic cable. The optical fibers of the cable are typically aligned to optics of the optical-electronic transmitters and receivers with a required precision of about 5 microns.

It is also conventional practice that the optical-electronics module with the transmitters and receivers are supplied to a customer having electrical circuit on the customer's circuit board to be connected to the optical-electronic transmitters and receivers. Generally the plane of the optical paths in the optical coupler is parallel to the plane of the customer's electronic circuitry, and the plane of the electronic inputs and outputs ("I/O") of the optical receivers and transmitters is orthogonal to the plane of the I/O of the customers electronic circuitry. Therefore, in order to connect the I/O of the electronic circuitry on the customer's board to the electrical I/O of the optical-electronic transmitters and receivers it is necessary to turn the electrical path between the respective sets of I/O.

Referring to FIG. 1, the alignment of optical paths and the turning of the electrical path between I/O sets is illustrated in a prior art module 100, which includes a carrier 110 mounted on a heat sink 180, an optical-electronic die 120 mounted on the carrier 110, a coupler 140, a signal conditioning die 190, a flexible cable 130, a first circuit board 170, and C4 solder balls 175. The circuit board 170 has die 190 mounted thereon. The die 190 has signal conditioning circuitry that interconnects to and operates with the optical-electronic circuitry of the die 120 by means of the flexible cable 130. The die 190 also interconnects to a customer's circuit board, second circuit board 172, via conductors (not shown) and C4 solder balls 175.

The carrier 110 is for structural purposes and for conducting thermal energy away from the die 120. The carrier 110 does not have embedded conductors, but the carrier 110 itself is conductive, and it electrically connects a cathode on the laser die 120 to ground. The prior art apparatus uses two carriers, side-by-side. Only one of the carriers 110 is shown in FIG. 1. On one of the carriers 110, the die 120 is a laser die. On the other carrier 110, the die 120 is a photo detector die. (The term "optical-electronic die" will be used herein to refer to either a laser die or a photo detector die.) In FIG. 1, the die 120 is bonded to the carrier 110, such as with a die attach epoxy, on the same side of the carrier 110 as an optical coupler 140. The carrier 110 has alignment holes for receiving pins 142 from the coupler 140. The coupler 140 attaches to the carrier 110 with a retainer (not shown) and alignment pins 142.

A fiber-optic cable 160 having a number of embedded fibers 162 mates to the optical coupler 140. A connector 150 of the fiber-optic cable 160 has alignment holes for receiving alignment pins 152 from the coupler 140. The coupler 140 attaches to the connector 150 with a retainer (not shown) and alignment pins 152.

The flexible cable 130 is a composition of gold-coated, copper conductors etched in a polyimid and covered with an insulating jacket. The flexible cable 130 is attached at attachment 137 to the first circuit board 170 at one end and at attachment 134 to carrier 110 for the optical-electronic die 120 at the other end. The flex cable 130 is electrically connected at 132 to the die 120 by wire bonds 136. Likewise, the flex cable 130 is electrically connected at 139 to die 190 with wire bonds 138.

The flex cable 130 provides a 90 degree turn between the I/O plane of the optical-electronic die 120 and the customer's board, second circuit board 172, however, it is problematic to use the flex cable to provide this 90 degree bend because of its cost and because of the relatively large number of interconnections at 132, 134, 137, etc. Also, with conventional arrangements such as that of FIG. 1 it is problematic to achieve required alignment precision since it requires expensive and time consuming "active" alignment, according to which the optical-electronic die is powered and its output monitored, then secured with adhesive once alignment is optimized. There is therefore a need for an improved optical-electronics module.

SUMMARY OF THE INVENTION

The foregoing need is addressed in an optical-electronic module having a submount. The submount forms an aperture which extends all the way through the submount. An optical-electronic die is mounted on a first side of the submount. The module also has an optical coupler, with a fiber-optic path in the coupler, for coupling optical signals from or to a fiber-optic cable on a first end of the coupler and for coupling the optical signals from or to the die at a second end of the coupler. The second end of the coupler has a feature matching the submount aperture and inserted into the submount aperture. An optical input or output of the die faces the second end of the coupler and is aligned to the coupler fiber-optic path and optically coupled to the fiber-optic path through the aperture.

In another aspect, pads for electronic inputs or outputs on the optical-electronic die face, align with, and are electrically coupled to first electrical pads on the submount first side.

In another aspect, the aperture is tapered, narrowing toward the submount first side, and the coupler feature matching the submount aperture comprises a tapered nose narrowing toward the coupler second end.

In another aspect, the coupler end proximate to the die (the coupler second end) is sub-flush to the submount first side. From the coupler side which is proximate the die, the coupler extends through the submount aperture and beyond the submount second side.

In still another aspect, the submount first side is in a first plane, and the submount has a third side in a plane oblique or perpendicular to the first plane. The third side has second electrical pads, for connecting to electrical pads on a circuit board. The second electrical pads are connected by conductors of the submount to respective ones of the first electrical pads, so that electrical paths from the electronic inputs or outputs of the optical-electronic die turn by at least an acute angle from the first to the second submount electrical pads.

In a still further aspect, the coupler has mechanical pads for coupling to the circuit board. In an alternative, the coupler mechanical pads are on a bottom side of the coupler and the coupler bottom side is in the same plane as the submount third side.

In a method form of the invention, a method for fabricating an optical-electronic array module includes a providing a submount having first and second opposing sides and a third side essentially perpendicular to the first submount side. The first and third submount sides have an adjoining edge, and the submount forms an aperture extending through the submount from the first to the second sides. Conductive traces are formed on the first and third sides and adjoining edge of the submount using a shadow mask. The traces interconnect electrically conductive pads on the first submount side and second electrically conductive pads on the submount third side. An optical coupler is inserted into the submount aperture and secured therein. The coupler has a fiber-optic path therein for coupling optical signals from or to a fiber-optic cable on a first end of the coupler and for coupling, at a second end of the coupler, the optical signals from or to a die mounted on the submount first side. The second end of the coupler has a feature matching the submount aperture. An optical input or output of the die is aligned to the coupler fiber-optic path facing the second side of the coupler concurrently with aligning pads on the die for electrical inputs or outputs to the electrical pads on the submount first side.

In a further aspect, the method includes mounting the die on the submount, wherein the optical inputs or outputs of the die are aligned to the coupler fiber-optic path, and the electronic input or output pads on the die are aligned to first electrical pads on the submount first side prior to the die being mounted on the submount.

In a still further aspect, the optical inputs or outputs of the die are aligned to the coupler fiber-optic path, and the electronic input or output pads on the die are aligned to first electrical pads on the submount first side after the coupler is secured to the submount.

In yet another aspect, the optical inputs or outputs of the die are aligned to the coupler fiber-optic path, and the electronic input or output pads on the die are aligned to first electrical pads on the submount first side with the die deenergized.

It is an object of the invention to bend an electrical path between I/O of a circuit board and I/O of an optical-electronic die without using a flexible cable, thus reducing cost, shortening the electrical path, and improving electrical properties of the interconnections.

It is another object of the invention to facilitate precise alignment between fiber-optic paths and optics of devices on the optical-electronic die.

Other objects and advantages of the invention will become apparent upon reading the following detailed description and upon reference to the accompanying drawings.

DETAILED DESCRIPTION OF THE INVENTION

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
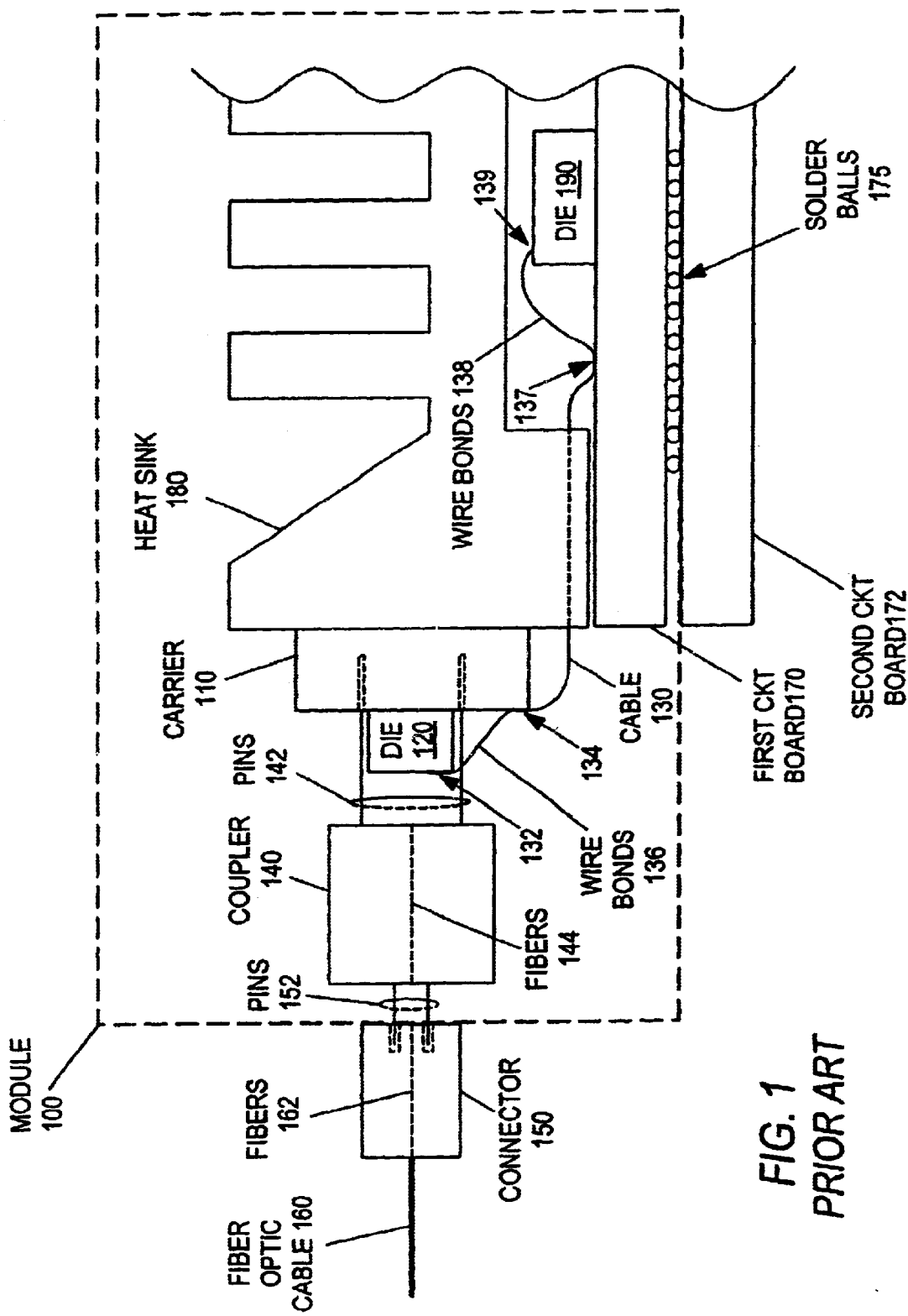
FIG. 1 shows a prior art optical-electronic array module connected to a fiber-optic cable and a customer's circuit board.
Figure 2:
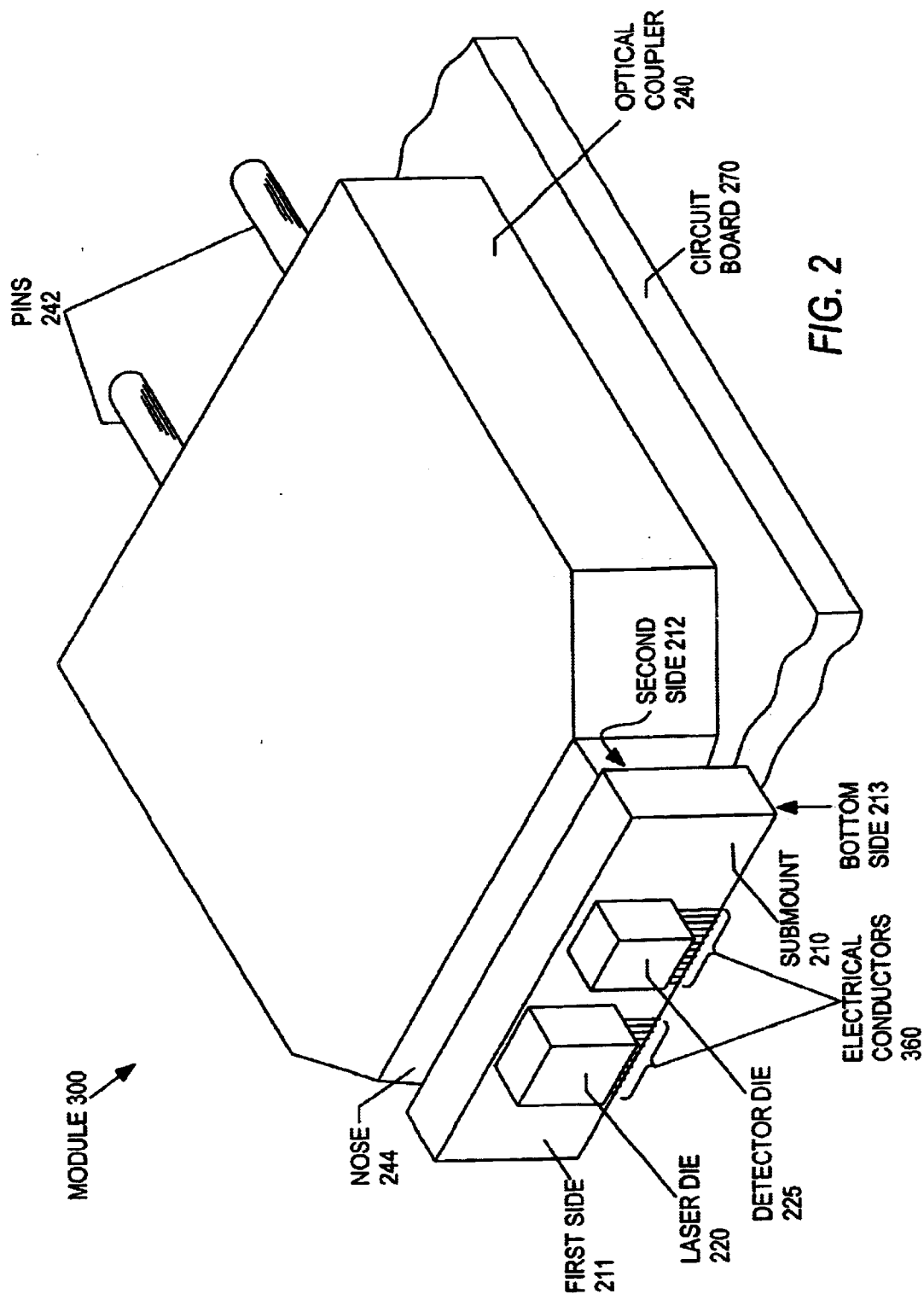
FIG. 2 shows an isometric view of an optical-electronics array module, according to an embodiment of the present invention.

Referring now to FIG. 2, an optical-electronic array module 200 is shown. The large trapezoidal shaped object 240 is an optical coupler for coupling optical signals between optical fibers in a fiber-optic cable (not shown) and laser die 220 and photo detector die 225. The fiber-optic cable secures to the end of the coupler 240 having pins 242. The coupler 240 pins 242 are for aligning the coupler 240 with a connector (not shown) on the end of the fiber-optic cable. The other end of the coupler 240 has a tapered nose 244 which precisely fits a silicon submount 210. The optical-electronic laser die 220 and photo detector die 225 are flip chip mounted onto the submount 210 on the outboard side 211 of the submount 210, that is, the side 211, opposite the side 212 that engages the optical coupler 240. Flip chip mounting is characterized by the chip (that is, the die) being mounted with its I/O facing the carrier on which it is mounted, which for dies 220 and 225 is the submount 210. Electrical conductors 360 provide electrical interconnection between laser die 220 to a bottom side 213 of submount 210 and between detector die 225 and the bottom side 213 pads (not shown in FIG. 2), where the pads connect to a circuit board 270 that has signal conditioning circuitry (not shown), for connecting to a customer circuit board (not shown).

The coupler 240 has two sheets of silicon (not shown), with V-shaped grooves (not shown) in at least one of the sheets, and optical fibers (not shown) in the grooves. The two sheets are laminated together so as to embed the fibers. The optical fibers inside the coupler 240 run in a single plane from the end with the pins 242 to the end fitted up to the submount 210. The ends (not shown) of the coupler 240 are highly polished, so that light easily transmits through the ends and the fibers. The optical fibers are typically 50 microns in diameter, or a little larger.

Figure 3A:
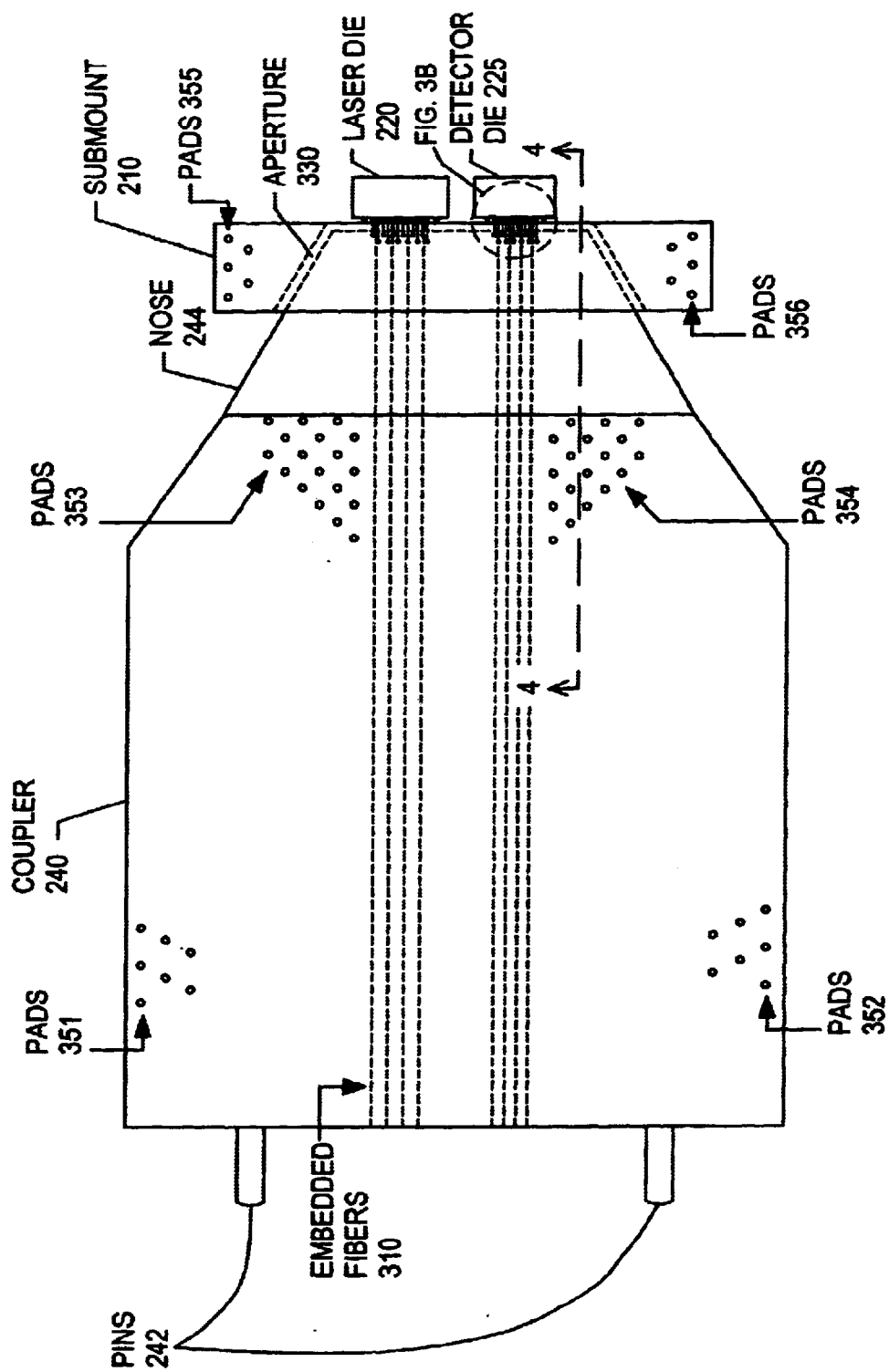
FIG. 3A shows an orthographic view of the bottom of the module of FIG. 2.

Referring now to FIG. 3A, an orthographic view of the bottom of the coupler 240 and submount 210 is shown. The embedded fibers 310 traverse the length of the coupler 240, as previously stated. The silicon submount 210 is shown positioned on the nose 244 of the coupler 240. (In an embodiment, this submount 210 is attached to the coupler 240 by a ultraviolet light cured epoxy.) An aperture 330 through the submount 210 is visible as hidden lines in the submount 210. Since the coupler nose 244 is fitted into the aperture 330, even though the laser die 220 and detector die 225 are mounted on the outboard side of the silicon submount 210, there is nevertheless an optical path through the aperture 330 of the submount 210, so that the optics of the laser die 220 and detector die 225 may be coupled to optical signals via the fibers 310 in the coupler 240 and the fiber optic cable, which is coupled to the coupler 240 at the pin 242 end.

In one aspect the shapes of the nose 244 and aperture 330 serve an alignment purpose. Note that the aperture 330 of the submount 210 is tapered on all four sides, as is the nose 244 of the coupler 240. The aperture 330 is formed in the submount 210 by etching. It is well known that silicon has a natural tendency to etch precisely at a certain well-controlled angle. The silicon submount 210 is therefore ground to a tapered shape at an angle matching tat of the aperture 330, so that the nose 244 of the coupler 240 and the submount 210 fit together precisely. With the coupler secured in the submount 210 aperture 330 there is a 50 to 75 micron gap between the nose 244 of the coupler and the inboard side of the laser 220 and detector 225 dies facing the nose 244 of the coupler 240, which permits collecting divergent light yet provides a space. The bottom of the optical coupler 240 has a number of sets of pads 351 through 354 for mounting the coupler 240 on circuit board 270 (not shown). Likewise, the bottom side 213 of the submount 210 (which in the present embodiment is coincident with the bottom of the optical coupler 240) has two sets of pads 355 and 356 for attaching the submount 210 to the circuit board 270 as well. The submount 210 and dies 220 and 225 have other pads as well, which will be shown more clearly in enlarged views described herein below.

Once the silicon submount 210 is attached to the coupler, the laser 220 and detector 225 dies are placed on the submount 210 by an precision alignment die placement machine (not shown) and flip chip bonded to the submount 210. Applying flip chip mounting of the dies 220 and 225 to the submount 210, which itself has been securely and precisely fit to the coupler 240, further enables precise alignment of the optical fibers 310 in the coupler 240 to the optical outputs of the laser die 220 and optical inputs of the detector die 225. As previously stated, for flip chip mounting, the chip (that is, the die) is mounted with its I/O, including optical and electronic I/O, facing the carrier (that is, submount 210 in this case). Thus the precision alignment die placement machine can align the optics of the dies 220 and 225 with the fibers 310 at the same time that it ensures the electronic inputs of the laser die 220 and electronic outputs of the detector die 225 are sufficiently aligned with the corresponding pads of the submount 210. This increases precision of alignment of the optical fibers 310 in the coupler 240 to the optics of the dies 220 and 225, because it allows compensation by the machinery for some misalignment between the submount 210 and coupler 240. In one embodiment, the fibers 310 themselves are used by the machine for alignment, at least in part. Alternatively, the coupler 240 grooves are used as alignment fiducial for the machine vision system.

Figure 3B:
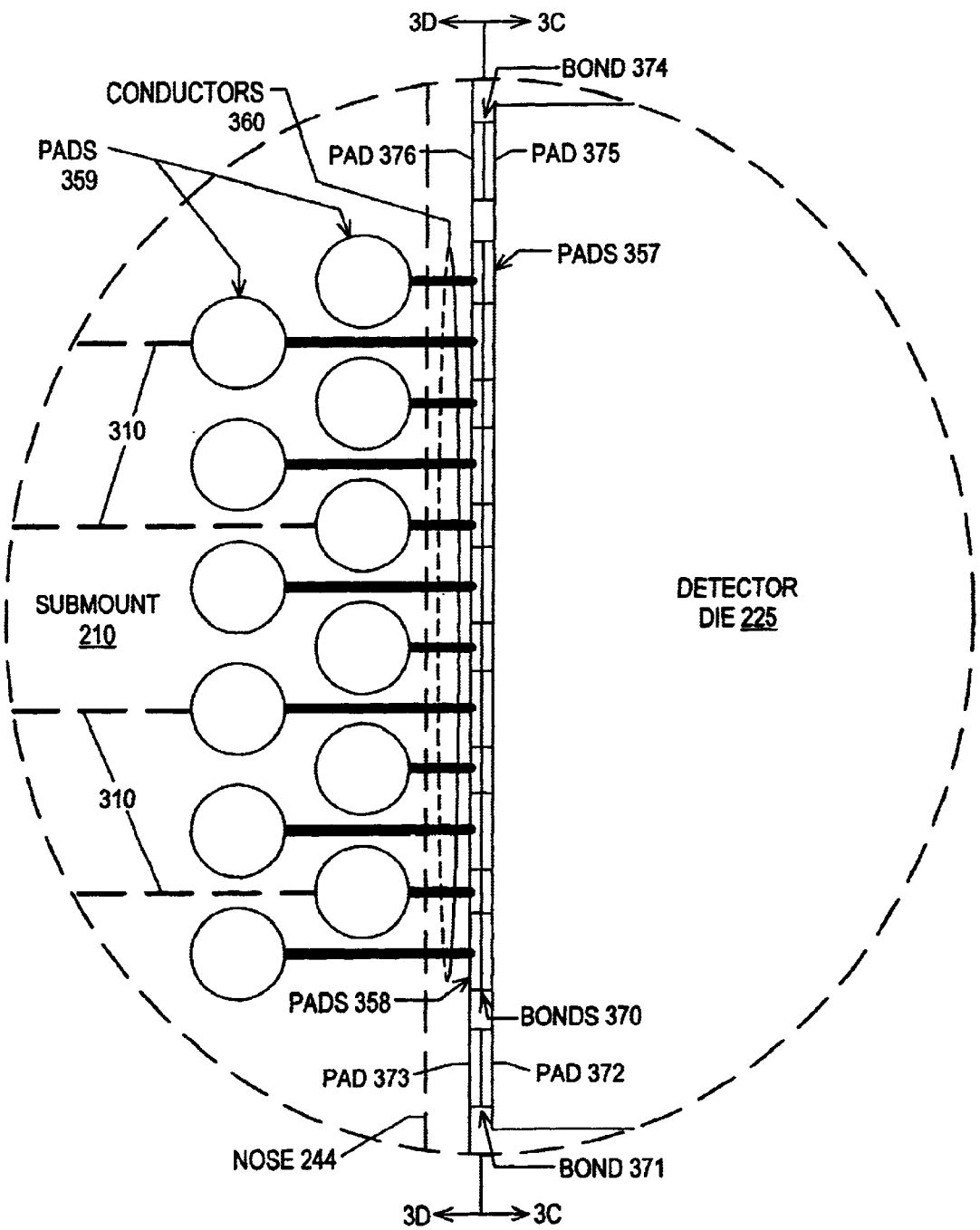
FIG. 3B shows an enlarged view of a portion of the module of FIG. 2.

Referring now to FIG. 3B, further details are shown of the flip chip mounting aspect of the embodiment in an enlarged view. (In the view of FIG. 3B only one of the dies 225 is visible, but it should be understood that similar details apply to both die 225 and die 220.) In the embodiment of the present invention, the sides of the die 225 and the submount 210 that face each other have respective gold pads 357 and 358, which are bonded together by heating. In FIG. 3B, the combination of the bonded submount pads 358 and die pads 375 are referred to as respective bonds 370. In addition to the bonds 370 which connect conductors 360 on the submount 210 to electronic I/O of the die 225 (via pads 357 of the die 225), FIG. 3B also shows a bond 371, including pad 372 on the die 225 and pad 373 on the submount 210, and bond 374, including pad 375 on the die 225 and pad 376 on the submount 210, which are solely for mechanical attachment of the die 225 to the submount 210. Two other such mechanical bonds exist between the die 225 and the submount 210, but are not visible in this view.

Eutectic gold is used instead of solder for bonding the respective pads of the submount 210 and dies 220 and 225 to one another, which includes pads 358 and 357, pads 372 and 373, pads 374 and 375, etc. Eutectic gold is more stable than solder, that is, does not shift as much. Also, eutectic gold wets at a higher temperature, provides a tighter and more precise fit, and uses less material. These factors further contribute to more precise aligning of the optical fibers 310 to the optics of the dies 220 and 225.

The submount 210 also has pads 359 on its bottom side, which is the side adjacent to the outboard side, and has conductors 360 that interconnect respective pads 358 and 359 on these two adjacent sides of the submount 210. These conductors 360 will be further explained herein below.

Figure 3C:
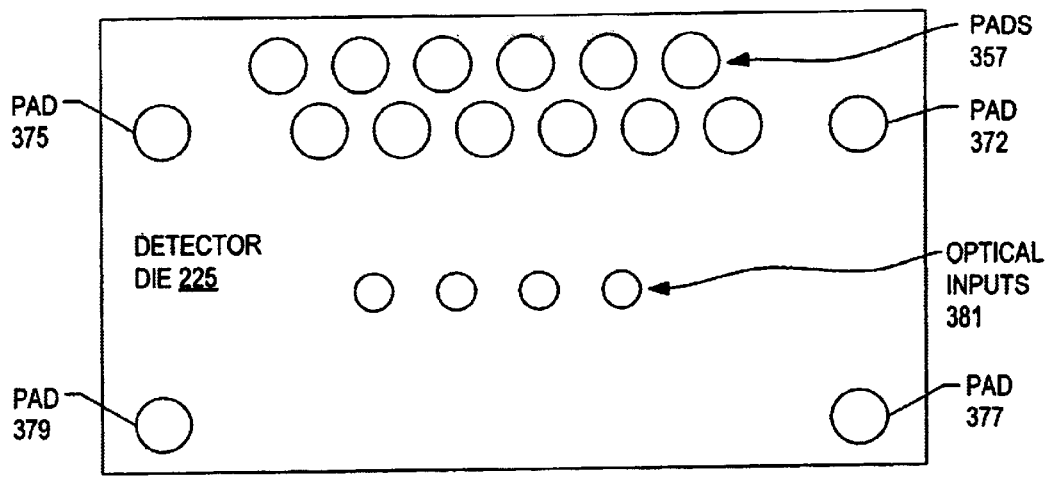
FIG. 3C shows a side view of the detector die of FIG. 3B.

Referring now to FIG. 3C, the side of the detector die 225 that faces the submount 210 is shown. In the embodiment, the detector die 225 has four detectors, and therefore four optical inputs 381 are visible in this view. (Herein optical inputs or outputs may be referred to as "optics.") Also shown in this view are the pads 357 for electrical outputs from the photo detectors of the detector die 225, and four pads 372, 375, 377 and 379 for mechanical attachment to the submount 210.

Figure 3D:
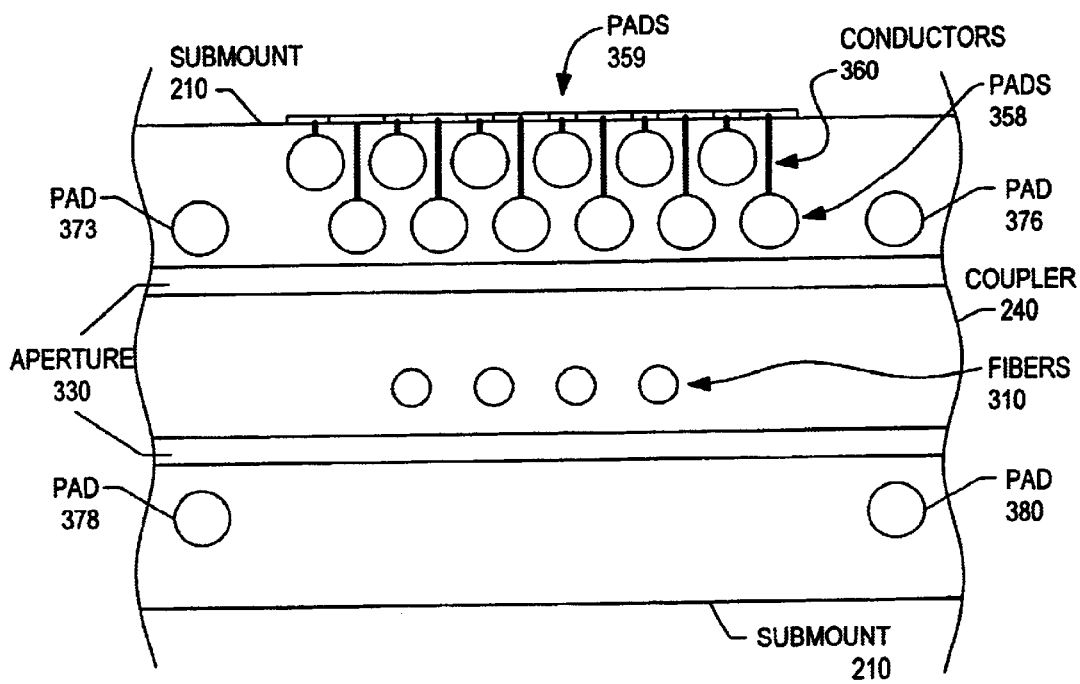
FIG. 3D shows a portion of the sides of the submount and coupler of FIG. 3B.

Referring now to FIG. 3D, portions of the sides of the submount 210 and coupler 240 that face the die 225 are shown. A polished end of the coupler 240 is visible in this view. Four of the fibers 310 may be seen through the end. Also visible in this view are the pads 359 and 358 on the bottom and side, respectively, of the submount 210, as well as the conductors 360 that interconnect respective ones of the pads 359 and 358. The pads 358 on the side of the submount 210 face the die 225 and connect to the pads 357 (FIG. 3B) for the electrical outputs of the detector die 225 by means of the eutectic gold bonding previously described. Also shown are four pads 373, 376, 378 and 380 for mechanical attachment to the die 225 pads 372, 375, 377 and 379.

Figure 4:
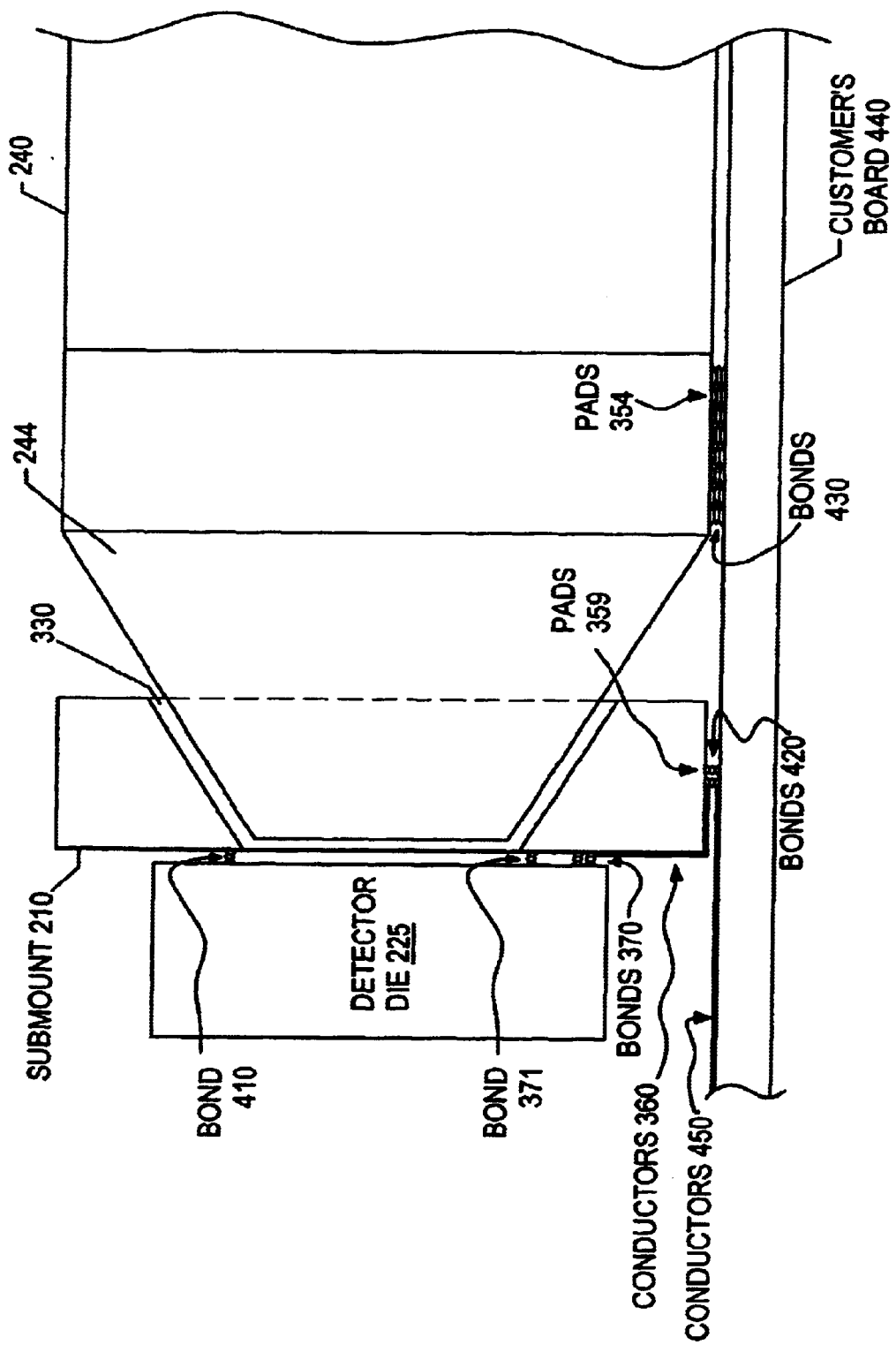
FIG. 4 shows a cross-section of the submount, detector die, and a portion of the coupler of FIG. 3A, along with a portion of a customer's circuit board, according to an embodiment of the present invention.

Referring once again to FIG. 3A, a section line 4—4 is shown indicating orientation of a view in FIG. 4. In the view of FIG. 4 a cross-section of the submount 210, die 220 and a portion of the coupler 240 are shown along with a portion of the circuit board 270, according to an embodiment, to illustrate certain aspects of the invention in greater detail.

Visible in the view of FIG. 4 is another one of the bonds 374 between the submount 210 and the die 225 that is solely for mechanical and not electrical purposes. In the embodiment, the detector die 225 and four mechanical bonds, bonds 371 and 374 of which are visible in this view, create a sort of four legged table, so that the mechanical bonds secure the die 225 in a precise position with respect to the submount 210.

The bottom of the coupler 240 is connected to the circuit board 270 by C4 solder balls, which together with pads 358 are components of mechanical bonds 430. The submount 210 is also connected to the circuit board 270 by C4 solder balls. Also visible in FIG. 4 are bonds 420 between the bottom of the submount 210 and circuit board 270. These bonds 420 include the C4 solder balls and pads 359 on the submount 210 that were previously shown in detail and described in connection with FIG. 3B. The bonds 420 are electrically connected to conductors 450 on the circuit board 270 which connect to signal conditioning circuitry (not shown) on the circuit board 270, which in turn connect to circuitry on a customer's circuit board (not shown). In this manner electronic devices on the customer's board are electrically coupled, via signal conditioning circuitry, to the electronic I/O of the detector die 225. In similar fashion the electronic I/O of the detector die 225 are also electrically coupled to electronic devices on the customer's board.

Figure 5:
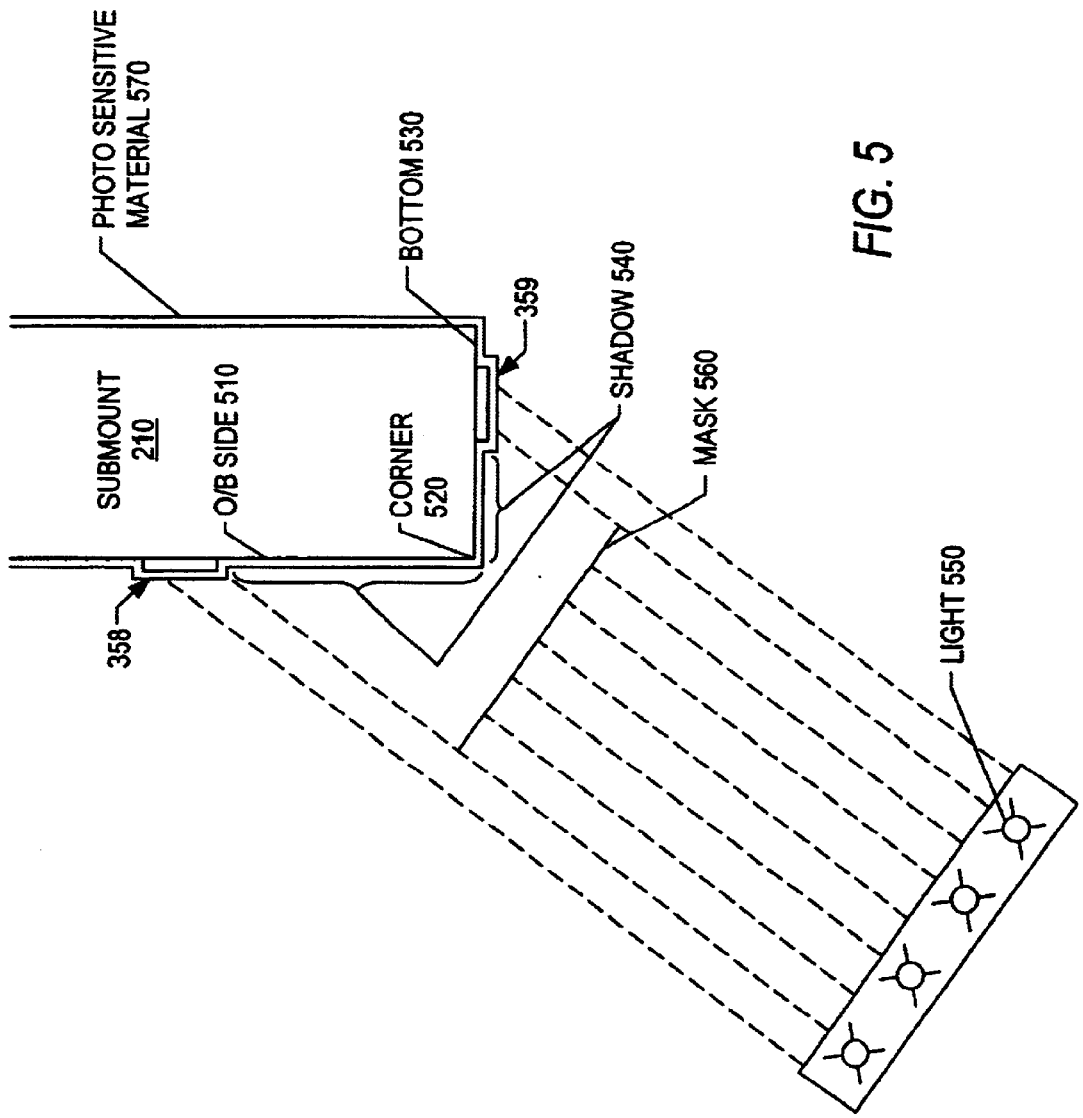
FIG. 5 shows details of how a shadow mask is used to fabricate conductors on the submount of FIG. 3B and 3D, according to an embodiment of the present invention.

FIG. 5 illustrates how shadow masking is used to etch conductors onto the submount 210, including around a corner 520 of the submount 210. (The term "submount" that is used herein encompasses a carrier which provides a 90 degree bend, or at least an acute angle bend, for an electrical connection.) A photosensitive material 570 is deposited on the submount 210. Then a mask 560 is held nearby the outboard side 510 and the bottom 530 of the submount 210, at an angle somewhere between parallel to the bottom 530 and parallel to the side 510 such that a light 550 shined on the side of the mask 560 opposite that of the submount 210 casts a shadow 540 on the submount 210 which delineates areas on the bottom 530, corner 520 and outboard side 510 of the submount, including at least a portion of the pads 359 on the bottom 530 and pads 358 on the outboard side 510, where the photosensitive material 570 is to be etched. Then the light 550 is extinguished, the mask 560 is removed, and the exposed areas are etched away and metallized, such as by sputtering, thereby creating conductors 360 (FIG. 3B) on the bottom 530, around the corner 520 and on the outboard side 510 of the submount 210, where the conductors are in electrical contact with respective ones of the pads 359 on the bottom 530 and pads 358 on the outboard side 510.

Having achieved the metalizing on the bottom 530, around the corner 520 and on the side 510 of the submount 210, including the pads 358 and 359, and having electrically bonded the pads 358 on the side 510 of the submount 210 to the die 220 (FIG. 3B), the pads 359 on the bottom 530 of the submount 210 are connected to circuitry on the circuit board 270 (FIG. 4), thereby securing the submount 210 and electrically connecting circuitry on the circuit board 270 to the die 220. Moreover, this is done without a flexible cable.

The description of the present embodiment has been presented for purposes of illustration, but is not intended to be exhaustive or to limit the invention to the form disclosed. Many modifications and variations will be apparent to those of ordinary skill in the art. For example, in the embodiment described above the optical-electronic array assembly 300 has 4 lasers and 4 detectors. In alternative configurations, there are 12 lasers and 12 detectors in an array. This configuration uses a single 12 fiber cable for the lasers, and another 12 fiber cable for the detectors. In another configuration, there are four lasers and for detectors in an array. This configuration uses a single 12 fiber cable, with four of the fibers near one edge of the cable dedicated to the lasers, for of the fibers near the other edge of the cable dedicated to the photo detectors. The four fibers in between are not used. A small form factor array has just one laser and one detector. Numerous other alternative embodiments exist.

Other means exist for providing the conductors between the pads of the inboard and bottom sides of the submount, other than that described in connection with FIG. 5. According to one alternative, gold conductors are plated instead of being deposited by sputtering. According to another alternative, the submount has layers and vias for internal conductors between the pads of the inboard and bottom sides of the submount.

To reiterate, the embodiments were chosen and described in order to best explain the principles of the invention and its practical applications, and to enable others of ordinary skill in the art to understand the invention. Various other embodiments having various modifications may be suited to a particular use contemplated, but may be within the scope of the present invention.

What is claimed is:

1. An optical-electronic array module comprising:
   a submount, including an aperture extending therethrough, having an optical-electronic die mounted on a first side thereof; and
   an optical coupler, having a fiber-optic path therein for coupling a fiber-optic cable on a first end of the coupler with a second end of the coupler.
   wherein the coupler includes a feature matching the submount aperture, and
   wherein with the coupler feature inserted into the aperture the matching feature tends to:
   i) align an optical input or output of the optical-electronic die to the coupler fiber-optic path, thereby tending to optically couple the die input or output to the fiber optic cable, and
   ii) align certain electrical input or output pads on the optical-electronic die to face first electrical pads on the submount first side.

2. The module of claim 1, wherein the aperture is tapered, narrowing toward the submount first side, and the coupler feature matching the submount aperture comprises a tapered nose narrowing toward the coupler second end.

3. The module of claim 2, wherein a second side of the submount is opposite the submount first side, and wherein the coupler extends from the coupler second end through the submount aperture, and beyond the submount second side.

4. The module of claim 1, wherein the submount first side is in a first plane, and the submount has a third side, the third side being in a plane oblique or perpendicular to the first plane,
   wherein the third side has second electrical pads, for connecting to electrical pads on a circuit board, and
   wherein the second electrical pads are connected by conductors of the submount to respective ones of the first electrical pads, so that electrical paths from the electronic inputs or outputs of the optical-electronic die turn by at least an acute angle from the first to the second submount electrical pads.

5. The module of claim 4, wherein the coupler has mechanical pads for coupling to the circuit board.

6. The module of claim 5, wherein the coupler mechanical pads are on a bottom side of the coupler and the coupler bottom side is in the same plane as the submount third side.

7. The module of claim 1, wherein the optical inputs or outputs of the die are aligned to the coupler fiber-optic path, and the electronic input or output pads on the die are aligned to first electrical pads on the submount first side prior to the die being mounted on the submount.

8. The module of claim 1, wherein the optical inputs or outputs of the die are aligned to the coupler fiber-optic path, and the electronic input or output pads on the die are aligned to first electrical pads on the submount first side after the coupler is secured to the submount.

9. The module of claim 1, wherein the optical inputs or outputs of the die are aligned to the coupler fiber-optic path, and the electronic input or output pads on the die are aligned to first electrical pads on the submount first side with the die deenergized.

10. An assembly comprising:
an optical-electronic die having electrically conductive pads;
a submount, wherein the submount has first and second opposing sides, and has a third side essentially perpendicular to the first submount side, wherein the first and third submount sides have an adjoining edge,
wherein the submount has electrically conductive pads on the first side bonded to the die pads, second electrically conductive pads on the third side of the submount, and electrically conductive traces interconnecting the first and second submount pads,
wherein the conductive traces are formed on the first and third sides and adjoining edge of the submount by a process that uses a shadow mask, and
wherein the submount forms an aperture extending through the submount; from the first submount side to the second submount side; and
an optical coupler having a fiber-optic path therein for coupling optical signals from or to a fiber-optic cable on a first end of the coupler and for coupling optical signals from or to the die at a second end of the coupler,
wherein the second end of the coupler has a feature matching the submount aperture,
wherein the feature is inserted into the submount aperture, and
wherein an optical input or output of the die faces the second side of the coupler and is aligned to the coupler fiber-optic path and optically coupled to the fiber-optic path through the aperture.

11. The module of claim 10, wherein the aperture is tapered, narrowing toward the submount first side, and the coupler feature matching the submount aperture comprises a tapered nose narrowing toward the coupler second end.

12. The module of claim 11, wherein the coupler second end is proximate to, and
wherein from the coupler second end the coupler extends through the submount aperture and beyond the submount second side.

13. The module of claim 10, wherein the coupler has mechanical pads for coupling to the circuit board.

14. The module of claim 13, wherein the coupler mechanical pads are on a bottom side of the coupler and the coupler bottom side is in the same plane as the submount third side.

15. The module of claim 10, wherein the optical inputs or outputs of the die are aligned to the coupler fiber-optic path, and the electronic input or output pads on the die are aligned to first electrical pads on the submount first side prior to the die being mounted on the submount.

16. The module of claim 10, wherein the optical inputs or outputs of the die are aligned to the coupler fiber-optic path, and the electronic input or output pads on the die are aligned to first electrical pads on the submount first side after the coupler is secured to the submount.

17. The module of claim 10, wherein the optical inputs or outputs of the die are aligned to the coupler fiber-optic path, and the electronic input or output pads on the die are aligned to first electrical pads on the submount first side with the die deenergized.

18. A method for fabricating an optical-electronic array module, the method comprising the steps of:
a) providing a submount having first and second opposing sides and a third side essentially perpendicular to the first submount side,
wherein the first and third submount sides have an adjoining edge,
wherein the submount forms an aperture extending through the submount from the first side the second sides;
b) forming conductive traces on the first and third sides of the submount and on an edge adjoining the first and third sides,
wherein the conductive traces are formed using a shadow mask,
wherein the traces interconnect first electrically conductive pads on the first submount side and second electrically conductive pads on the submount third side;
c) inserting into the submount aperture and securing therein an optical coupler having a fiber-optic path therein,
wherein the optical coupler is for coupling optical signals from or to a fiber-optic cable on a first end of the coupler to or from a second end of the coupler,
wherein the second end of the coupler has a feature matching the submount aperture;
aligning an optical input or output of the die to face the second side of the coupler; so that the die is aligned and optically coupled to the coupler fiber-optic path through the submount aperture; and
e) aligning pads for electrical inputs or outputs on the die to the electrical pads on the submount first side,
wherein the aligning in step d) is concurrent with the aligning in step e).

19. The method of claim 18, comprising the step of mounting the die on the submount, wherein the optical inputs or outputs of the die are aligned to the coupler fiber-optic path, and the electronic input or output pads on the die are aligned to first electrical pads on the submount first side prior to the die being mounted on the submount.

20. The module of claim 18, comprising the step of mounting the die on the submount, wherein the optical inputs or outputs of the die are aligned to the coupler fiber-optic path, and the electronic input or output pads on the die are aligned to first electrical pads on the submount first side after the coupler is secured to the submount.

21. The module of claim 18, comprising the step of mounting the die on the submount, wherein the optical inputs or outputs of the die are aligned to the coupler fiber-optic path, and the electronic input or output pads on the die are aligned to first electrical pads on the submount first side with the die deenergized.

* * * * *

UNITED STATES PATENT AND TRADEMARK OFFICE
CERTIFICATE OF CORRECTION

PATENT NO. : 6,634,802 B2
DATED : October 21, 2003
INVENTOR(S) : Brezina et al.

It is certified that error appears in the above-identified patent and that said Letters Patent is hereby corrected as shown below:

Column 9,
Line 35, after "proximate to" please insert -- the die --.

Signed and Sealed this

Eighth Day of June, 2004

JON W. DUDAS
*Acting Director of the United States Patent and Trademark Office*